United States Patent
Yamashita

(10) Patent No.: US 7,868,505 B2
(45) Date of Patent: Jan. 11, 2011

(54) MOTOR AND ELECTRIC POWER SUPPLY CONTROL APPARATUS FOR THE MOTOR

(75) Inventor: Masaharu Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 307 days.

(21) Appl. No.: 12/295,984

(22) PCT Filed: Apr. 3, 2007

(86) PCT No.: PCT/IB2007/000870
§ 371 (c)(1),
(2), (4) Date: Oct. 3, 2008

(87) PCT Pub. No.: WO2007/113651
PCT Pub. Date: Oct. 11, 2007

(65) Prior Publication Data
US 2010/0170741 A1 Jul. 8, 2010

(30) Foreign Application Priority Data
Apr. 4, 2006 (JP) .............................. 2006-102632

(51) Int. Cl.
*H02K 1/00* (2006.01)
(52) U.S. Cl. .................... 310/181; 310/166; 310/168; 310/171
(58) Field of Classification Search ................ 310/106, 310/155, 166–171, 180–181; 318/701, 254
See application file for complete search history.

(56) References Cited

U.S. PATENT DOCUMENTS

| | | | | |
|---|---|---|---|---|
| 2,816,240 A | * | 12/1957 | Zimmerman | ................. 310/155 |
| 3,984,711 A | * | 10/1976 | Kordik | .................... 310/49.46 |
| 4,348,605 A | * | 9/1982 | Torok | ......................... 310/168 |
| 4,595,865 A | | 6/1986 | Jahns | |
| 5,051,640 A | * | 9/1991 | Freise | ........................ 310/162 |
| 5,059,884 A | * | 10/1991 | Shah et al. | .................. 318/701 |
| 5,117,144 A | * | 5/1992 | Torok | ......................... 310/269 |
| 5,304,882 A | * | 4/1994 | Lipo et al. | ............. 310/156.53 |
| 5,455,473 A | * | 10/1995 | Lipo et al. | .................. 310/190 |

(Continued)

FOREIGN PATENT DOCUMENTS

EP 0 394 527 10/1990

(Continued)

*Primary Examiner*—Thanh Lam
(74) *Attorney, Agent, or Firm*—Oblon, Spivak, McClelland, Maier & Neustadt, L.L.P.

(57) ABSTRACT

In a ring body of a stator, permanent magnets are arranged in alternate inter-pole magnetic path portions located between an even number of stator poles so that magnetic fields pointing in the circumferential direction of the ring body are generated. Coils are wound around alternate inter-pole magnetic path portions where permanent magnets are not provided so that magnetic fields that oppose the magnetic fields generated by the permanent magnets are generated. When electric power is not supplied to the coils, a ring-shaped magnetic circuit is formed by the permanent magnets, and therefore, magnetic flux does not leak to a rotor. When electric power is supplied to the coils, the magnetic flux of the magnetic fields of the permanent magnets and that of the coils combine with each other and flow from the stator poles to rotor poles of the rotor, whereby strong attraction force is obtained.

11 Claims, 15 Drawing Sheets

U.S. PATENT DOCUMENTS

| | | |
|---|---|---|
| 5,672,925 A | 9/1997 | Lipo et al. |
| 6,051,904 A | 4/2000 | Akemakou |
| 6,359,413 B1 | 3/2002 | Schulz et al. |
| 2003/0062869 A1 | 4/2003 | Ieoka |

FOREIGN PATENT DOCUMENTS

| | | |
|---|---|---|
| EP | 0 707 374 | 4/1996 |
| EP | 0 909 010 | 4/1999 |
| JP | 2 36759 | 2/1990 |
| JP | 9 103056 | 4/1997 |
| JP | 10 341560 | 12/1998 |
| JP | 2000 64949 | 3/2000 |
| JP | 2000 152577 | 5/2000 |
| JP | 2001 37189 | 2/2001 |
| JP | 2002 199679 | 7/2002 |
| JP | 2004 236369 | 8/2004 |
| WO | 03 007459 | 1/2003 |
| WO | 2006 019058 | 2/2006 |

* cited by examiner

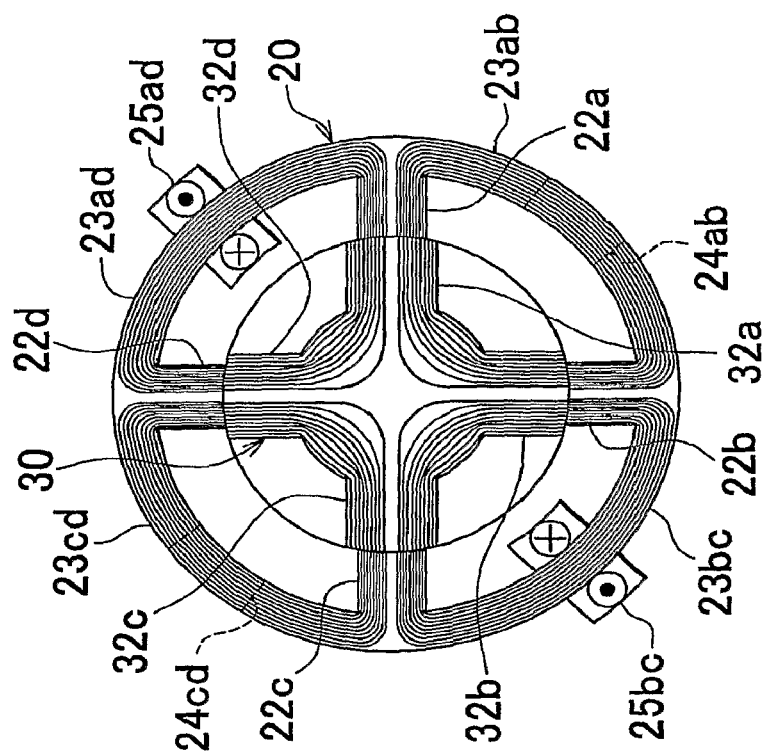
FIG. 2A — WHEN ELECTRIC POWER IS NOT SUPPLIED
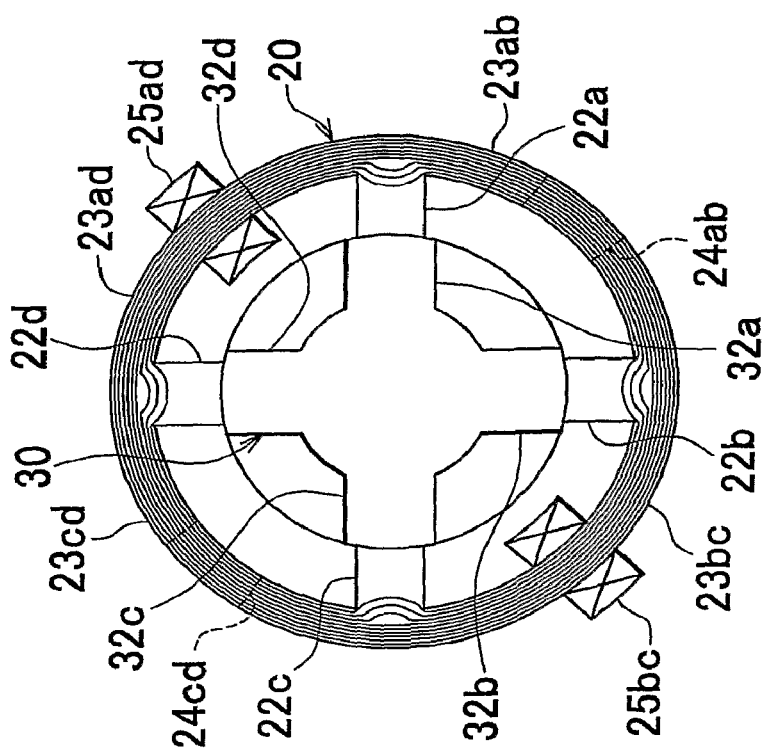
FIG. 2B — WHEN ELECTRIC POWER IS SUPPLIED

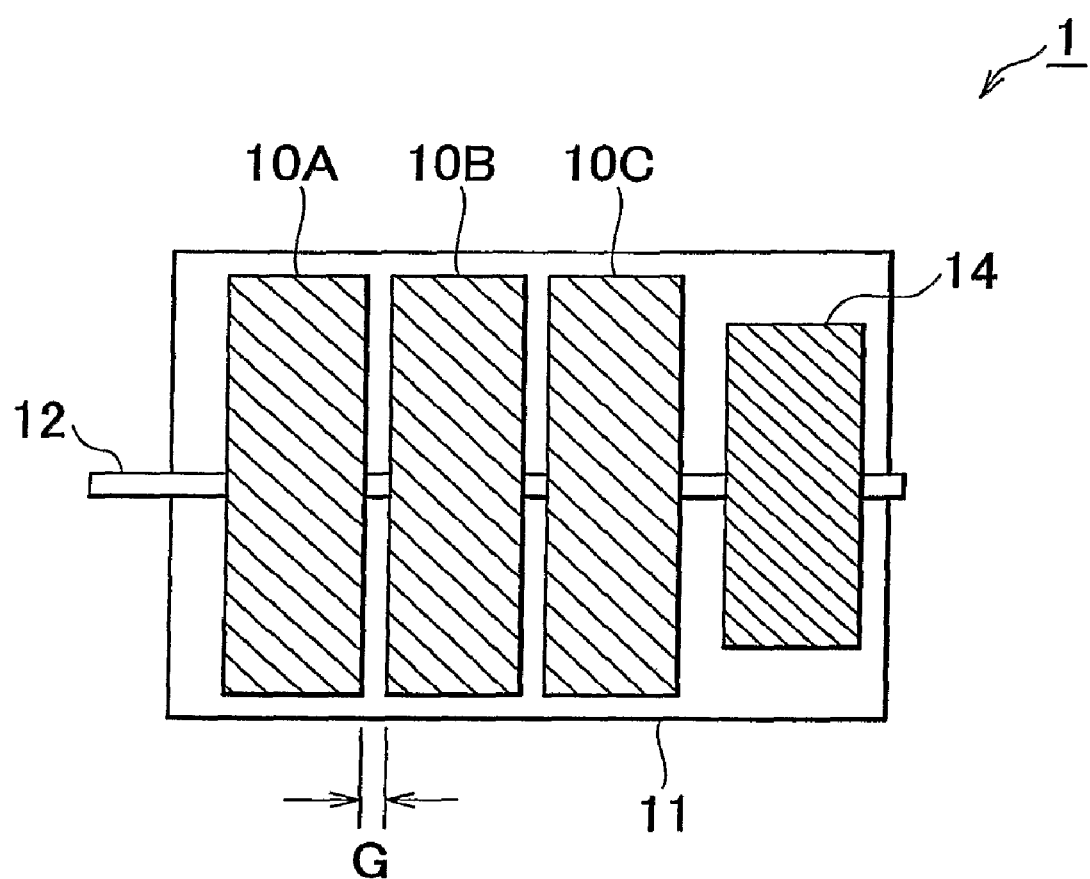

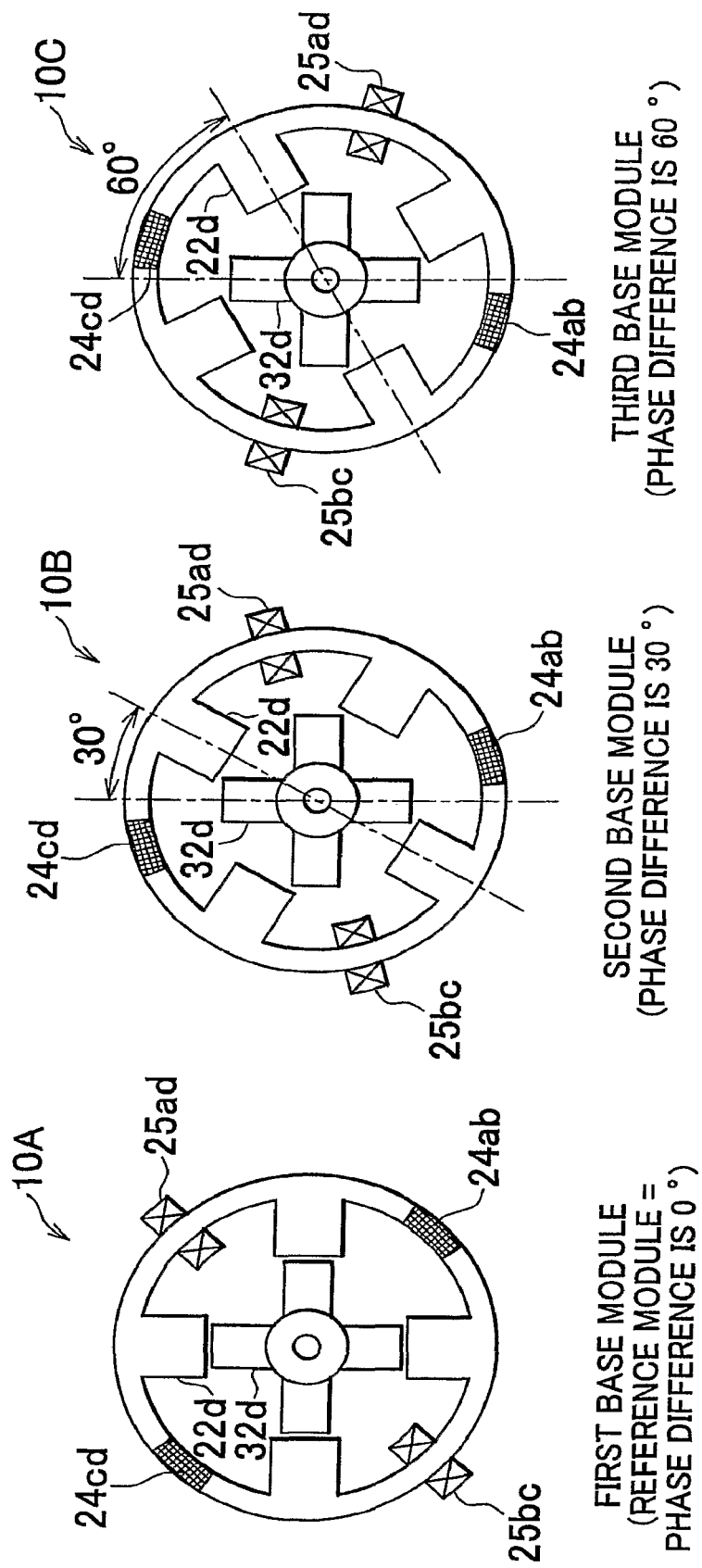

STATE WHERE ELECTRICAL ANGLE IS 0° OR 360°

STATE WHERE ELECTRICAL ANGLE IS 180°

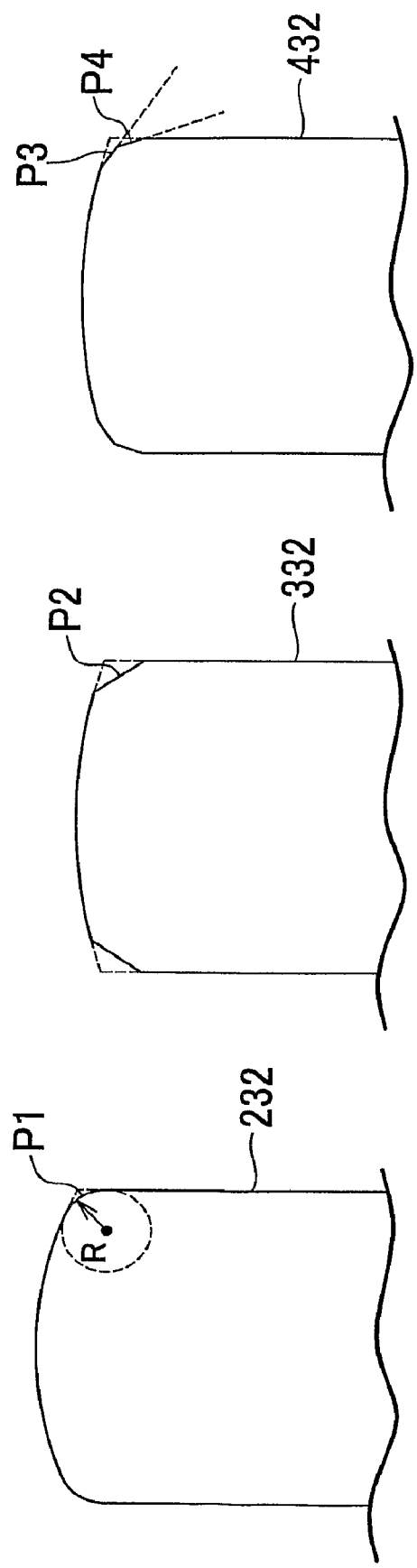

F I G . 17
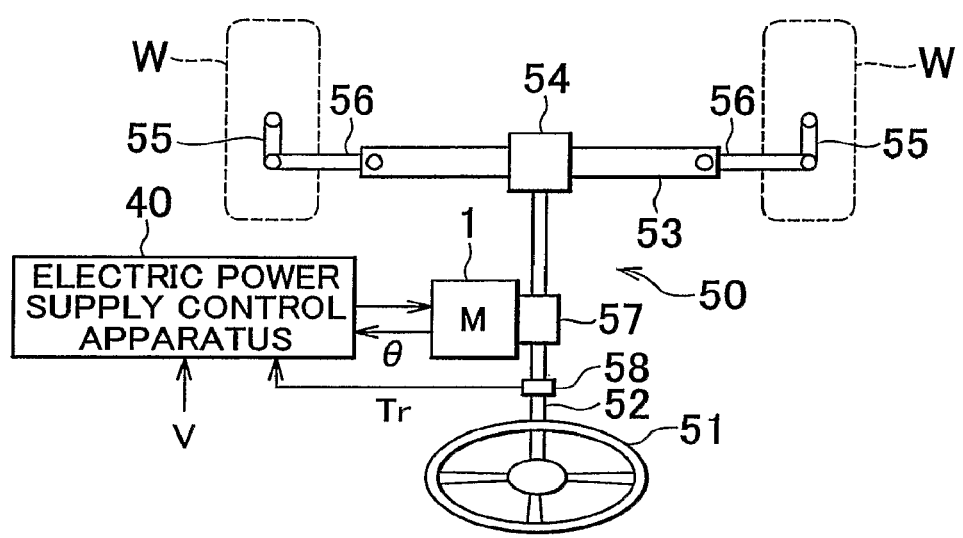

MOTOR AND ELECTRIC POWER SUPPLY CONTROL APPARATUS FOR THE MOTOR

BACKGROUND OF THE INVENTION

1. Field of the Invention

The invention relates to a motor that uses attraction force generated by a permanent magnet, and an electric power supply control apparatus for the motor.

2. Description of the Related Art

In an electric power steering system that steers the steering wheels of a vehicle, for example, a surface mounted permanent-magnet motor (SPM motor) is used as the drive unit. In recent years, the demands for more efficient and higher-power electric power steering systems have been growing. However, if the motor produces higher power, motor loss torque, cogging torque, and motor inertia (system inertia) increase in proportion with the increase in the power produced by the motor. As a result, the steering feel felt by a driver deteriorates.

Although fluctuations in motor torque affect the steering feel, such torque fluctuations may be controlled by controlling the current supplied to the motor in a feedback manner. However, motor loss torque, which occurs when electric power is not supplied to the motor, may cause the deterioration of the steering feel, for example, the driver's steering wheel to turn in an unintentional direction, because feed-back control cannot be performed when electric power is not supplied to the motor. Cogging torque is also caused when electric power is not supplied to the motor. Accordingly, the cogging torque also causes deterioration of the steering feel, because feed-back control cannot be performed when electric power is not supplied to the motor. In addition, such motor loss torque and cogging torque increase in proportion to the output from the motor. This hampers increases in the motor efficiency and power output from the motor.

In addition, a high-powered motor requires a large number of magnetic circuits in a rotor and a stator. This increases the volume and rotor inertia moment. Accordingly, in the electric power steering system, compensation control is performed to reduce torque fluctuations due to such inertia. However, it is not possible to perform complete compensation due to a time constant of the motor or performance of the sensor. In this case, when the inertia is small, compensation for the fluctuation is sufficient to keep the driver from feeling the toque fluctuations. However, if the inertia is large, the inertia will affect the steering feel.

Japanese Patent Application Publication No. 2004-236369 (JP-A-2004-236369) describes a switched reluctance motor (SR motor) that produces high power and in which cogging torque is reduced. In the motor described in JP-A-2004-236369, multiple salient-pole portions, around which coils are wound and which extend inward, are arranged, along the circumferential direction, on the inner face of a stator that surrounds a rotor, and permanent magnets are buried in the salient-pole portions around which the coils are wound. When electric power is supplied to the coils, the rotor is attracted by strong magnetic attraction force due to magnetic flux synthesized from the magnetic flux generated by the coils and the magnetic flux generated by the permanent magnets. Thus, high torque is obtained. To reduce cogging torque, the following structure is employed. In the structure, the permanent magnet is buried in the salient-pole portion at a position closer to the side thereof that faces against the direction in which the rotor rotates, and the magnetic pole face of the permanent magnet faces the interior of the salient-pole portion.

However, even with the structure described in JP-A-2004-236369, transverse magnetic flux between the stator and the rotor remains due to the permanent magnet arranged at the salient-pole portion of the rotor. Accordingly, the cogging torque is not appropriately reduced. As a result, even if such a motor is used in an electric power steering system, the steering feel does not improve.

SUMMARY OF THE INVENTION

The invention suppresses torque fluctuations due to cogging torque, etc. that occur when electric power is not supplied to a motor.

A first aspect of the invention relates to a motor that includes a stator having a hollow cylindrical ring body that forms a magnetic path, wherein an even number of stator poles are arranged at regular intervals in the circumferential direction of the ring body and the stator poles project inward, in the radial direction, from the inner face of the ring body. The motor also includes a rotor, arranged coaxially within the stator, that forms a magnetic path, wherein the rotor has rotor poles that project outward, in the radial direction, from the outer face of the rotor and the rotor poles face the stator poles when the rotor is at a predetermined rotational position. The motor further includes permanent magnets that are arranged in alternate inter-pole magnetic path portions among an even number of inter-pole magnetic path portions located between successive stator poles so that magnetic fields pointing in the circumferential direction are generated; and coils that are wound around the remainder of the alternate inter-pole magnetic path portions where no permanent magnets are arranged so that magnetic fields that oppose the magnetic fields generated by the permanent magnets are generated.

According to the first aspect of the invention, an even number of stator poles are formed on the inner face of the ring body, and the permanent magnets and the coils are alternately arranged at the inter-pole magnetic path portions located between the consecutive stator poles. The number of the inter-pole magnetic path portions is equal to the number of the stator poles. Among these inter-pole magnetic path portions, the permanent magnets are arranged in the alternate inter-pole magnetic path portions, and the coils are wound around the inter-pole magnetic path portions where no permanent magnets are arranged. The permanent magnets are arranged so that magnetic fields pointing in the circumferential direction of the ring body are generated. The coils are wound around the inter-pole magnetic path portions so that magnetic fields that oppose the magnetic fields generated by the permanent magnets are generated when electric power is supplied to the coils. For example, if there are two stator poles, two inter-pole magnetic path portions are formed. In this case, a permanent magnet is arranged in one of the inter-pole magnetic path portions, and a coil is wound around the other inter-pole magnetic path portion. If the number of the stator poles is four or more, permanent magnets are arranged in alternate inter-pole magnetic path portions. The permanent magnets are arranged so that the magnetic fields generated by the permanent magnets are pointing in the same direction.

Accordingly, when electric power is not supplied to the coils, magnetic flux flows along the circumference of the ring-shaped magnetic body due to the magnetic fields generated by the permanent magnets, and the magnetic flux does not leak from the stator poles toward the rotor. When electric power is supplied to the coils, magnetic fields that oppose the magnetic fields generated by the permanent magnets are generated in the inter-pole magnetic path portions around which the coils are wound. Accordingly, the magnetic flux of the magnetic fields generated by the permanent magnets and the magnetic flux of the magnetic fields generated by the coils are combined with each other, and flow from the stator poles to the rotor poles of the rotor. Namely, the magnetic field generated by the permanent magnet is pushed back by the opposing magnetic field generated by the coil. Then, a flow of magnetic flux from the inter-pole magnetic path portion, through the stator pole, the rotor pole, the rotor magnetic body, the adjacent rotor pole, the adjacent stator pole, to the inter-pole magnetic path portion is produced. Similarly, the magnetic field generated by the coil is pushed back by the opposing magnetic field generated by the permanent magnet. Then, a flow of magnetic flux from the inter-pole magnetic path portion, through the stator pole, the rotor pole, the rotor magnetic body, the adjacent rotor pole, the adjacent stator pole, to the inter-pole magnetic path portion is produced.

Accordingly, when electric power is not supplied to the coils, the flow of magnetic flux between the poles (between the stator pole and the rotor pole) is suppressed, which prevents cogging torque and loss torque. Therefore, according to the first aspect of the invention, it is possible to suppress torque fluctuations when electric power is not supplied to the coils.

In the first aspect of the invention, the rotor may be symmetric with respect to the rotating shaft of the rotor. With this structure, it is possible to prevent forces pointing in the directions perpendicular to the rotor shaft from becoming unbalanced, thereby reducing noise and vibration.

In the first aspect of the invention, the stator and the rotor may be soft magnetic bodies. This increases motor efficiency (the ratio of the energy output from the motor to the energy input in the motor).

In the first aspect of the invention, each of the stator and the rotor may be formed by stacking multiple magnetic steel sheets each of which has a thickness up to one millimeter. With this structure, it is possible to appropriately reduce an eddy current loss and a hysteresis loss. As a result, high motor efficiency is achieved.

In the first aspect of the invention, when the stator pole and the rotor pole face each other and the center-lines of the stator pole and the rotor pole coincide, the length of an air gap between the stator pole and the rotor pole may increase as the distance from the center-lines of the stator pole and the rotor pole increases. In this case, end faces of the stator pole and the rotor pole, which face each other, may be curved faces that partially form faces of virtual cylinders, the axis of the virtual cylinder the face of which includes the end face of one of the stator pole and the rotor pole may be offset from the center of the rotating shaft in the radial direction so that the length of the air gap increases as the distance from the center-lines increases in the circumferential direction.

With this structure, the torque changes moderately and smoothly with respect to the amount by which the rotor moves. The rotor pole and the stator pole come close to each other and apart from each other as the rotor rotates. A change in the torque when the rotor pole and the stator pole move with respect to each other while facing each other is reduced. As a result, a motor with less torque fluctuation is formed.

In the first aspect of the invention, a notched groove, which is recessed inward in the radial direction, may be formed in the outer face of the ring body of the stator at a position at which the stator pole is formed.

With this structure, when the magnetic field generated by the permanent magnet is pushed back by the magnetic field generated by the coil, the notched groove guides the flow of magnetic flux toward the stator pole. Accordingly, when electric power is supplied to the coils, the magnetic flux is appropriately passed to the rotor, which makes it possible to efficiently generate attraction force between the poles. In addition, the weight of the ring body is reduced.

In the first aspect of the invention, a radius of the ring body at the inter-pole magnetic path portion around which the coil is wound may be greater than a radius of the ring body at the inter-pole magnetic path portion in which the permanent magnet is arranged.

With this structure, it is easier to guide the magnetic flux of the permanent magnet, which flows in the circumferential direction of the ring body, toward the stator poles when electric power is supplied to the coils, because the radius of the ring body varies between the inter-pole magnetic path portion in which the permanent magnet is arranged and the inter-pole magnetic path portion around which the coil is wound. As a result, it is possible to appropriately guide the magnetic flux toward the rotor when electric power is supplied to the coils, which makes it possible to efficiently generate attraction force between the poles. In addition, a greater space for winding the coil is ensured on the inner side of the ring body, because the radius of the ring body at the inter-pole magnetic path portion around which the coil is wound is greater than the radius of the ring body at the inter-pole magnetic path portion in which the permanent magnet is arranged. This reduces copper loss.

A second aspect of the invention relates to a combination motor that includes at least three base modules each of which is formed of the motor according to the first aspect of the invention. According to the second aspect of the invention, the rotational position at which the stator pole and the rotor pole face each other varies with each base module by a substantially equal phase difference.

With this structure, it is possible to constantly generate torque regardless of the rotational angle and the rotational angular speed of the rotor. Namely, when the motor is formed of only one base module, the motor may fail to start if the rotor is stopped at a certain rotational angle. However, the phases of the poles are offset from each other, among the base modules, in the direction in which the rotors rotate so that the attraction force is generated evenly (at regular rotational angle intervals). Accordingly, such inconvenience does not occur. Therefore, the combination motor can be effectively applied for a system, as electric power steering system in which, the motor torque is required, even in the state that the rotational angular speed of the motor is zero, namely, even in the state that the motor is off.

In the second aspect of the invention, the at least three base modules may be connected to each other in the direction in which the rotating shaft extends, and an air gap may be maintained between the successive base modules.

With this structure, it is possible to prevent magnetic flux from leaking between the base modules, which reduces torque fluctuations.

A third aspect of the invention relates to an electric power supply control apparatus that controls electric power supply to the combination motor according to the second aspect of the invention. The electric power supply control apparatus includes a rotational angle sensor that detects the rotational angle of the rotor; and electric power supply means for supplying, based on the rotational angle detected by the rotational angle sensor, electric power to the coils of the base modules at times which vary with each base module by a phase difference corresponding to an electrical angle expressed by the following equation, electrical angle of 360°/n. Here, "n" represents the number of the base modules, and an electrical angle of 360° corresponds to a value obtained by dividing a mechanical angle of 360° by the number "m" of poles of one base module.

With this structure, electric power is supplied to the base modules for a period during which the rotor rotates by the predetermined rotational angle and electric power is supplied to the coils of the base modules at times that vary with each base module. This makes it possible to appropriately rotate the motor in either the clockwise direction or the counter-clockwise direction.

According to a fourth aspect of the invention, the combination motor according to the second aspect of the invention is used as a drive unit for an electric power steering system that steers the steering wheels of the vehicle. With this arrangement, the steering feel is improved, because the motor in which torque fluctuation is considerably small when electric power is not supplied to the coils is used in the electric power steering system.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIGS. 2A and 2B are the views each illustrating the magnetic flux distribution in the base module;

FIG. 3 is the view schematically showing a motor;

FIGS. 4A to 4C are the views illustrating phase differences among the base modules;

FIGS. 13A to 13C are the views showing the shapes of the end shoulder portions of the magnetic poles according to modified examples of the embodiment of the invention;

FIG. 17 is the view schematically showing an electric power steering system.

DETAILED DESCRIPTION OF THE EXAMPLE EMBODIMENT

Figure 1:
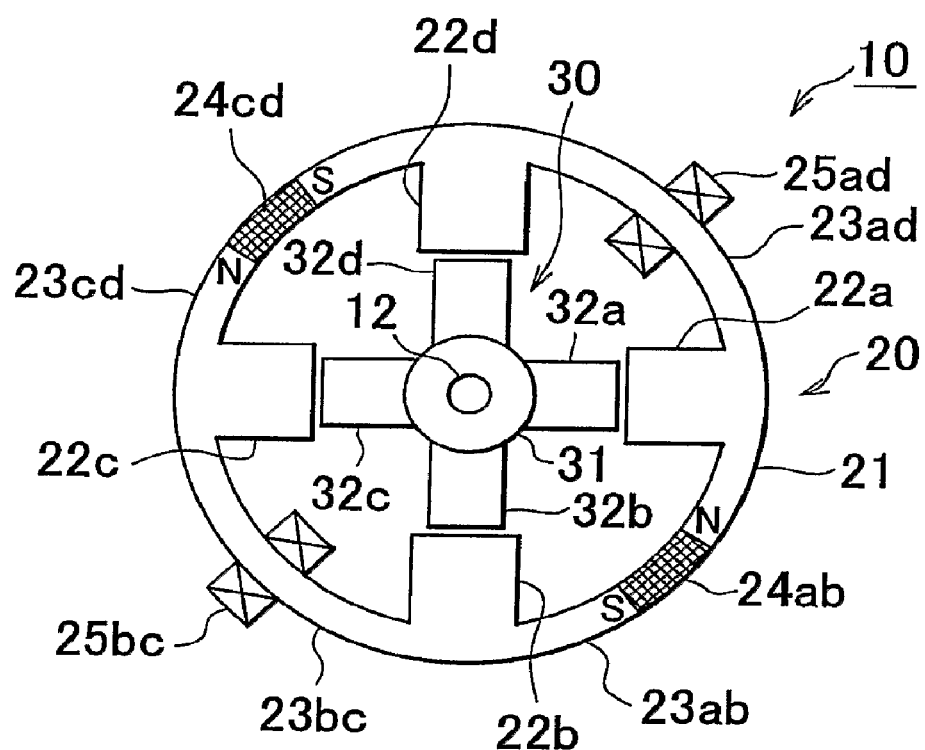
FIG. 1 is the cross-sectional view of a base module according to an embodiment of the invention, which is obtained by cutting the base module in the radial direction thereof.

Hereafter, a motor and an electric power supply control apparatus for the motor according to an embodiment of the invention will be described with reference to the accompanying drawings. As shown in FIG. 3, a motor 1 according to the embodiment of the invention is formed by connecting three base modules 10 (a first base module 10A, a second base module 10B, and a third base module 10C: these base modules will be collectively referred to as the base modules 10) to each other in the axial direction. The motor 1 is used as a drive unit for an electric power steering system which will be described later in detail. First, the base modules 10 will be described. FIG. 1 shows the base module 10 that forms the motor 1 according to the embodiment of the invention. The base module 10 includes a stator 20 fixed to a motor casing 11, and a rotor 30 that is arranged in the stator 20 so as to be able to rotate using a shaft 12 as the rotating shaft.

The stator 20 is formed of a hollow cylindrical ring body 21 having four integrally-molded stator poles 22a, 22b, 22c and 22d. The stator poles 22a, 22b, 22c and 22d are formed on the inner face of the ring body 21 at regular intervals in the circumferential direction of the ring body 21. The stator poles 22a, 22b, 22c and 22d project from the inner face of the ring body 21 inward in the radial direction of the ring body 21. In the stator 20, a magnetic path can be formed. In the embodiment of the invention, the stator 20 is formed into a hollow cylindrical shape by stacking, in the axial direction, multiple magnetic steel sheets each of which is pressed into a predetermined shape (each magnetic steel sheet is made of a soft magnetic material and has a thickness up to 1 millimeter). Each of the stator poles 22a, 22b, 22c and 22d is formed in a tooth shape. The stator poles 22a, 22b, 22c and 22d are arranged at regular intervals so that the ends thereof are positioned on the face of a virtual cylinder that is coaxial with the ring body 21.

Permanent magnets 24ab and 24cd are tightly buried in the ring body 21. The permanent magnet 24ab is buried in a ring magnetic path portion 23ab between stator poles (hereinafter, referred to as the "inter-pole magnetic path portion 23ab"), which is a portion of the ring body 21 between the stator pole 22a and the stator pole 22b. The permanent magnet 24cd is buried in a ring magnetic path portion 23cd between stator poles (hereinafter, referred to as the "inter-pole magnetic path portion 23cd"), which is a portion of the ring body 21 between the stator pole 22c and the stator pole 22d. These two permanent magnets 24ab and 24cd are oriented so that magnetic fields, pointing in the same direction along the circumference of the ring body 21, are generated. Namely, the two permanent magnets 24ab and 24cd are arranged so that the south pole of the permanent magnet 24ab and the north pole of the permanent magnet 24cd face each other on the magnetic path of the ring. In the embodiment of the invention, these two permanent magnets 24ab and 24cd are arranged so that magnetic fields pointing in the counter-clockwise direction, in FIG. 1, are generated. Coils 25ad and 25bc are wound around ring magnetic path portions between stator poles, in which the permanent magnet 24ab nor the permanent magnet 24cd is buried. The coil 25ad is wound around a ring magnetic path portion 23*ad* between stator poles (hereinafter, referred to as the "inter-pole magnetic path portion 23*ad*"), which is a portion of the ring body 21 between the stator pole 22*a* and the stator pole 22*d*. The coil 25*bc* is wound around a ring magnetic path portion 23*bc* between stator poles (hereinafter, referred to as the "inter-pole magnetic path portion 23*bc*"), which is a portion of the ring body 21 between the stator pole 22*b* and the stator pole 22*c*. The two coils 25*ad* and 25*bc* are wound around the inter-pole magnetic path portions 23*ad* and 23*bc*, respectively, so that magnetic fields that oppose the magnetic fields generated by the permanent magnets 24*ab* and 24*cd*, are generated when electric power is supplied to the coils 25*ad* and 25*bc*. In the embodiment of the invention, the coils 25*ad* and 25*bc* are wound around the inter-pole magnetic path portions 23*ad* and 23*bc*, respectively, so that the magnetic fields pointing in the clockwise direction, in FIG. 1, are generated. An electric power supply control circuit for the coils 25*ad* and 25*bc* will be described later.

In the ring body 21, the permanent magnets 24*ab* and 24*cd* are arranged alternately with the coils 25*ad* and 25*bc*. The permanent magnet 24*ab*, the permanent magnet 24*cd*, the coil 25*ad* and the coil 25*bc* are arranged at the inter-pole magnetic path portions 23*ab*, 23*cd*, 23*ad*, and 23*bc*, respectively. The inter-pole magnetic path portions 23*ab*, 23*bc*, 23*cd*, and 23*ad* form the magnetic paths between the four stator poles 22*a*, 22*b*, 22*c* and 22*d*. Hereafter, when it is not necessary to distinguish between the two permanent magnets 24*ab* and 24*cd*, these two permanent magnets will be collectively referred to as the permanent magnets 24. Similarly, when it is not necessary to distinguish between the two coils 25*ad* and 25*bc*, these two coils will be collectively referred to as the coils 25. When no distinction among the four inter-pole magnetic path portions 23*ab*, 23*bc*, 23*cd* and 23*ad* is required, these inter-pole magnetic path portions will be collectively referred to as the inter-pole magnetic path portions 23. Similarly, when no distinction among the four stator poles 22*a*, 22*b*, 22*c* and 22*d* is required, these stator poles will be collectively referred to as the stator poles 22.

The number of the stator poles 22 is not limited to four. The stator 20 may be provided with any even number of the stator poles 22. Accordingly, in the ring body 21, the permanent magnets 24 are buried in the alternate inter-pole magnetic path portions 23 among the even number of inter-pole magnetic path portions 23 that are located between the consecutive stator poles 22, so that the magnetic fields pointing in the circumferential direction are generated. In addition, the coils 25 are wound around the alternate inter-pole magnetic path portions 23 where no permanent magnets 24 are arranged, so that the magnetic fields that oppose the magnetic fields generated by the permanent magnets 24, are generated. In this case, if the number of the stator poles 22 is two, the permanent magnet 24 is buried in one of the inter-pole magnetic path portions 23, and the coil 25 is wound around the other inter-pole magnetic path portion 23. Neodymium-base magnets may be used as the permanent magnets 24. The magnetic force of the permanent magnets 24 is set so that 90% or more of the saturated magnetic flux is obtained in the ring body 21 through the magnetic force of only the two permanent magnets 24.

The rotor 30 is formed of a cylindrical center magnetic path portion 31 having four integrally-molded rotor poles 32*a*, 32*b*, 32*c* and 32*d*. The center magnetic path portion 31 is fixed to the shaft 12 that is rotatably fitted to the motor casing 11. The rotor poles 32*a*, 32*b*, 32*c* and 32*d* are formed on the outer face of the center magnetic path portion 31 at regular intervals in the circumferential direction. The rotor poles 32*a*, 32*b*, 32*c* and 32*d* project from the outer face of the center magnetic path portion 31 outward in the radial direction. The rotor 30 is symmetric with respect to the rotating shaft, and coaxial with the stator 20. As in the stator 20, a magnetic path can be formed in the rotor 30. In the embodiment of the invention, the rotor 30 is formed by stacking multiple magnetic steel sheets, in the axial direction, each of which is pressed into a predetermined shape (each magnetic steel sheet is made of a soft magnetic material and has a thickness up to 1 millimeter). Hereafter, when it is not necessary to distinguish among the four rotor poles 32*a*, 32*b*, 32*c* and 32*d*, these rotor poles will be collectively referred to as the rotor poles 32. Each of the rotor poles 32*a*, 32*b*, 32*c* and 32*d* is formed in a tooth shape. The number of the rotor poles 32 is equal to the number of the stator poles 22. When the rotor 30 is at a predetermined rotational angle, the rotor poles 32 face the stator poles 22.

In the base module 10, an air gap having a predetermined length is maintained between the stator pole 22 and the rotor pole 32. In the base module 10 that includes the stator 20 having an outer diameter up to 100 millimeters, the average length of the air gap may be in a range from 0.2 millimeters to 1.5 millimeters.

Next, the operation principle in the base module 10 will be described. FIGS. 2A and 2B illustrate the results of magnetism analysis. FIG. 2A shows the magnetic flux distribution when electric power is not supplied to the coils 25. FIG. 2B shows the magnetic flux distribution when electric power is supplied to the coils 25. FIGS. 2A and 2B illustrate the results of magnetism analysis in a base module that includes poles of which the size slightly differs from those of the base module 10 shown in FIG. 1. However, substantially the same results can be obtained in the base module 10 shown in FIG. 1. As shown in FIG. 2A, when electric power is not supplied to the coils 25, the ring-shaped magnetic circuit, through which the magnetic flux flows in the circumferential direction of the ring body 21, is formed by the magnetic fields generated by the permanent magnets 24. Accordingly, the magnetic flux does not leak from the stator poles 22 toward the rotor 30. Therefore, motor loss torque and cogging torque are hardly generated in this state.

When electric power is supplied to the two coils 25 at the same time, as shown in FIG. 2B, magnetic fields that oppose the magnetic fields generated by the permanent magnets 24, are generated in the inter-pole magnetic path portions 23 around which the coils 25 are wound. Then, the direction of the magnetic flux of the permanent magnets 24, which has been flowing in the ring body 21 in the circumferential direction, is changed. Thus, the magnetic flux of the magnetic fields generated by the permanent magnets 24 and the magnetic flux of the magnetic fields generated by the coils 25 are combined with each other, and then flow from the stator poles 22 to the rotor poles 32 of the rotor 30. Namely, the magnetic field generated by the permanent magnet 24*ab* is pushed back by the opposing magnetic field generated by the coil 25*ad* that is adjacent to the permanent magnet 24*ab* in the direction of the magnetic field generated by the permanent magnet 24*ab*. Then, a flow of magnetic flux from the inter-pole magnetic path portion 23*ab*, through the stator pole 22*a*, the rotor pole 32*a*, the rotor center magnetic path portion 31, the rotor pole 32*b*, and the stator pole 22*b*, to the inter-pole magnetic path portion 23*ab* is produced. Similarly, the magnetic field generated by the permanent magnet 24*cd* is pushed back by the opposing magnetic field generated by the coil 25*bc* that is adjacent to the permanent magnet 24*cd* in the direction of the magnetic field generated by the permanent magnet 24*cd*. Then, a flow of magnetic flux from the inter-pole magnetic path portion 23*cd*, through the stator pole 22*c*, the rotor pole 32c, the rotor center magnetic path portion 31, the rotor pole 32d, and the stator pole 22d to the inter-pole magnetic path portion 23cd is produced.

The magnetic field generated by the coil 25ad is pushed back by the opposing magnetic field generated by the permanent magnet 24ab that is adjacent to the coil 25ad in the direction of the magnetic field generated by the coil 25ad. Then, a flow of the magnetic flux from the inter-pole magnetic path portion 23ad, through the stator pole 22a, the rotor pole 32a, the rotor center magnetic path portion 31, the rotor pole 32d, and the stator pole 22d, to the inter-pole magnetic path portion 23ad is produced. Similarly, the magnetic field generated by the coil 25bc is pushed back by the opposing magnetic field generated by the permanent magnet 24cd that is adjacent to the coil 25bc in the direction of the magnetic field generated by the coil 25bc. Then, a flow of the magnetic flux from the inter-pole magnetic path portion 23bc, through the stator pole 22c, the rotor pole 32c, the rotor center magnetic path portion 31, the rotor pole 32b, and the stator pole 22b, to the inter-pole magnetic path portion 23bc is produced.

Accordingly, with the base module 10, high magnitude of magnetic fluxes are passed between the poles (between the stator poles 22 and the rotor poles 32) by effectively using the magnetic forces of both the permanent magnets 24 and the coils 25. This enables even the compact base module 10 to generate high attraction force. In addition, because neither permanent magnets nor coils are fitted to the rotor 30, the inertia is considerably lower than that of a DC brushless motor, an SPM motor, or an IPM motor (an embedded magnetic synchronous motor). The rotor 30 has even number of rotor poles 32 that are arranged at regular intervals, and is symmetric with respect to the shaft 12. Accordingly, the resultant of the forces pointing in the directions perpendicular the shaft 12 can be made zero. This suppresses noise and vibration. In addition, when the rotor 30 rotates, attraction force is generated at regular intervals in all the portions between the poles. Further, because the rotor 30 and the stator 20 are made of a soft magnetic material, the motor efficiency increases. In the embodiment of the invention, the end portions of each stator pole 22 and each rotor pole 32 are bilaterally symmetric, when viewed in the axial direction. Accordingly, the magnitude of the attraction force is bilaterally-symmetric with respect to the center of the stator pole 22, and, therefore, the same characteristics are obtained regardless of whether the motor is rotated in the clockwise direction or the counter-clockwise direction. Accordingly, the base module 10 is suitable for the motor for the electric power steering system that steers the wheels in the lateral direction.

Because the length of the air gap between the poles is equal to or longer than 0.2 millimeters, it is possible to prevent the magnetic flux from leaking toward the rotor 30 when electric power is not supplied to the coils 25. This minimizes the cross section of the ring body 21. Also, because the length of the air gap is equal to or shorter than 1.5 millimeters, the balance between moderately changing the attraction force and generating sufficient magnitude of the attraction force is optimally maintained, which makes it easier to control the amount of magnetic flux when minute electric currents are passed to the coils 25.

The soft magnetic body forming the base module 10 is formed by stacking multiple electromagnetic steel sheets each of which has a thickness up to 1 millimeter. Accordingly, it is possible to appropriately reduce eddy-current loss and hysteresis loss. As a result, high motor efficiency is achieved.

Because neodymium-base magnets are used as the permanent magnets 24 buried in the ring body 21, strong magnetic force is obtained, and, therefore, the size of the base module 10 may be reduced. In the base module 10, the direction of the flow of the magnetic flux of the permanent magnet 24 is changed to the direction toward the rotor poles 32 by electric power supply to the coil 25. Accordingly, the ring body 21 may be used near the flux saturation point. The density of the magnetic flux that can be effectively generated by the coil 25 is proportional to the magnetic force of the permanent magnet 24. As a result, the size of the stator 20 is inversely proportional to the value obtained by multiplying two by the square of the magnetic force (2×(square of magnetic force)). Accordingly, using the neodymium-base magnets that generate strong magnetic force reduces the size of the base module 10. Even if the electric current supplied to the coils is low, the attraction force for the rotor 30 can be generated.

Next, the motor 1 according to the embodiment of the invention where the three base modules 10 are connected to each other will be described. As shown in FIG. 3, the motor 1 is formed by connecting the first base module 10A, the second base module 10B, and the third base module 10C to each other in the axial direction, namely, by fixing the rotors 30 of the respective base modules 10 to the shaft 12 that serves as the rotating shaft shared by the three base modules 10. In the embodiment of the invention, three base modules 10 are used in the motor 1. However, the number of the base modules 10 is not limited to three. When the motor 1 is used in the electric power steering system, the number of the base modules 10 may be increased.

As shown in FIGS. 4A, 4B and 4C, the rotors 30 of the respective base modules 10 are fixed to the shaft 12 in a manner in which the rotor poles 32 of the rotors 30 are kept aligned. Meanwhile, the stators 20 of the base modules 10 are fixed to the motor casing 11 in a manner in which the positions of the stator poles 22 are offset from each other, among the stators 20, by a mechanical angle of 30 degrees in the direction in which the rotors 30 rotate. Namely, the phases of the stator poles 22 are offset from each other in the direction in which the rotors 30 rotate so that the base modules 10 generate attraction force evenly (at regular rotational angle intervals) when the rotors 30 rotate. The phase difference is a value obtained by dividing 360 degrees by the product of the number of poles of one base module and the number of the base modules (360°/number of poles of one base module×number of base modules). In the embodiment of the invention, because each base module has four poles, there are three base modules, the phase difference among the base modules 10 is 30 degrees. The phase difference is set so that the attraction force is generated evenly, namely, the attraction force between the poles is generated at predetermined rotational angle intervals in the entirety of base modules 10 when the rotors 30 rotate. Accordingly, the positions of the stator poles need not be offset from each other, among the base modules 10, at regular intervals. The phases of the rotors 30 may be offset from each other among the base modules 10. Alternatively, the phases of both the stators 20 and the rotors 30 may be offset from each other among the base modules 10.

Providing the base modules 10 so that the relative phases between the stator poles 22 and the rotor poles 32 are offset from each other at regular intervals makes it possible to constantly generate torque regardless of the rotational angle and the rotational angular speed of the rotors 30. Namely, when the motor is formed of only one base module 10, the motor may fail to start if the rotor 30 is stopped at a certain rotational angle. However, the phases of the poles are offset from each other, among the base modules 10, in the direction in which the rotors 30 rotate so that the attraction force is generated evenly. Accordingly, such inconvenience does not occur. Therefore, as in the electric power steering system, even if the rotational angular speed of the motor is zero, namely, even if the motor is off, the rotational torque can be generated.

As shown in FIG. 3, an air gap G is maintained between the successive base modules 10. The air gap G prevents magnetic flux leaks between the base modules 10. As a result, torque fluctuations are reduced.

Figure 7:
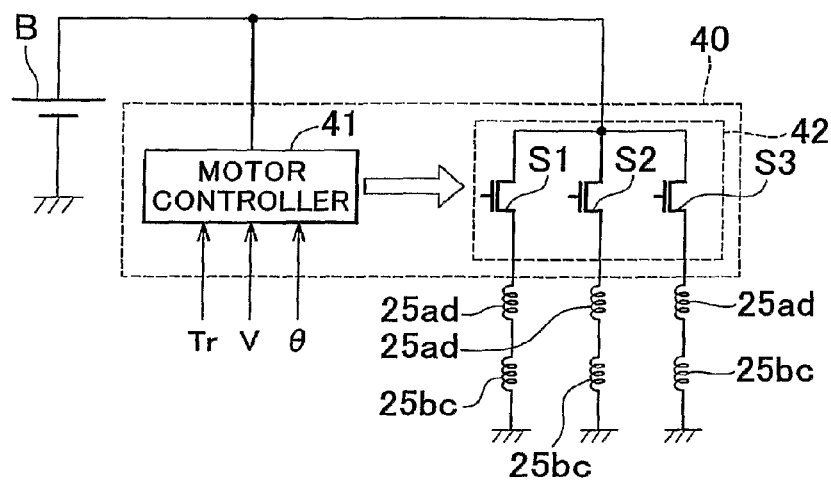
FIG. 7 is the view schematically showing an electric power supply control apparatus.
Figure 8:
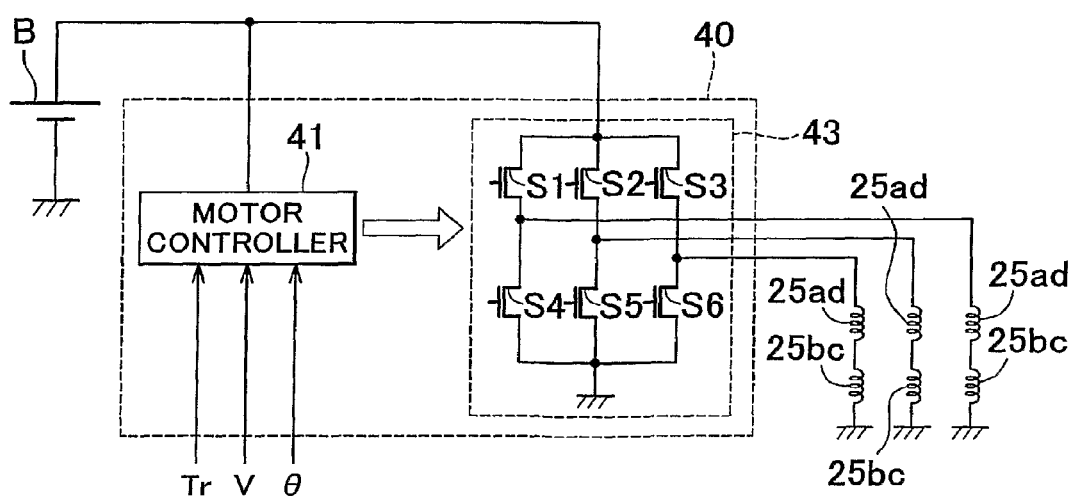
FIG. 8 is the view schematically showing an electric power supply control apparatus according to a modified example of the embodiment of the invention.

A rotational angle sensor 14 that detects the rotational angles (mechanical angles) of the rotors 30 is fitted to the shaft 12 of the motor 1. As shown in FIG. 7, an electric power supply control apparatus 40 that controls electric power supply to the coils 25 of the base modules 10 is connected to the motor 1. The electric power supply control apparatus 40 includes a motor controller 41 that is formed mainly of a microcomputer and calculates the motor control amount (the amount of electric power supplied to the motor), and a switching portion 42 that supplies electric power from a power supply unit B to the coils 25 in response to the control signals from the motor controller 41. The motor controller 41 receives a torque signal Tr from a steering torque sensor 58 that detects the steering torque of a driver's steering wheel 51 shown in FIG. 17 and a vehicle speed signal V from a vehicle speed sensor (not shown), and calculates the target electric power supply amount corresponding to the assist torque required for the electric power steering system. The motor controller 41 also determines the time during which electric power is supplied to the coils 25 based on a rotational angle signal θ from the rotational angle sensor 14. The switching portion 42 includes switching elements S1, S2 and S3 that are arranged between the coils 25 of the base modules 10 and the power supply unit B. As the switching elements S1, S2 and S3, for example, MOS-FETs (metal-oxide semiconductor field-effect transistors) are used. Instead of the switching portion 42, a switching portion 43 including six switching elements S1, S2, S3, S4 S5 and S6 may be formed, as shown in FIG. 8.

Next, the control of the electric power supply to the motor 1 executed by the electric power supply control apparatus 40 will be described. The time during which electric power is supplied to the coils 25 of each base module 10 will be described below. The description of the control of the electric power supply amount based on the assist torque for the electric power steering system will not be provided below. The following description will be provided on the assumption that the electric power supply amount is maintained constant.

Figure 6A:
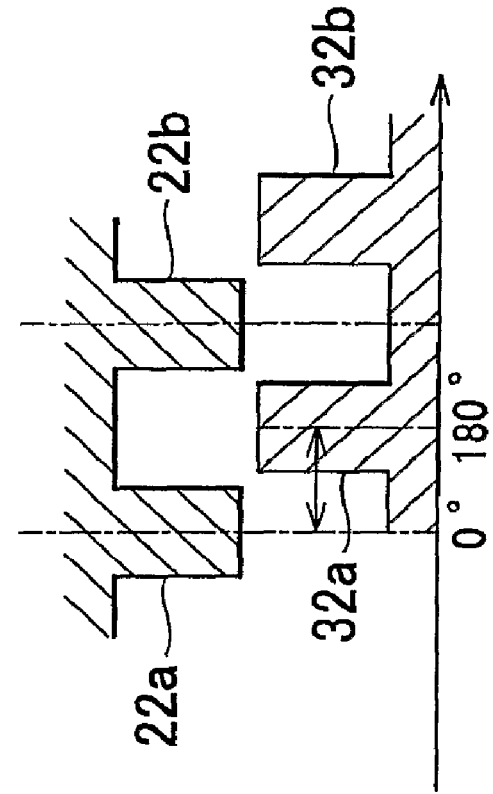
FIGS. 6A and 6B are the views each illustrating the positional relationship between stator poles and rotor poles.
Figure 6B:
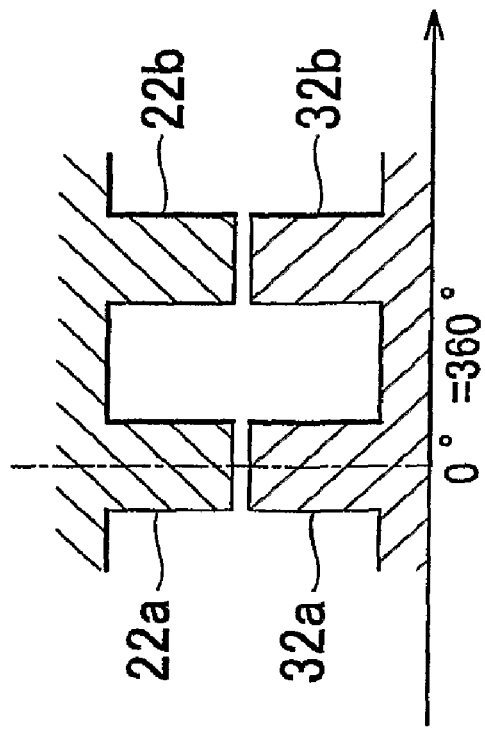

FIGS. 6A and 6B illustrate movement of the rotor poles 32 with respect to the stator poles 22 in the base module 10. The rotational angle at which the center-line of the stator pole 22 of the first base module 10A coincides with the center-line of the rotor pole 32 is the electrical angle of 0 degrees. Then, the rotor 30 is rotated in the clockwise direction. The rotational angle at which the center-line of the stator pole 22 of the first base module 10A coincides with the center-line of the next rotor pole 32 next time is the electrical angle of 360 degrees. Accordingly, when the number of the poles of one base module 10 is "m", the value obtained by dividing the mechanical angle of 360 degrees by "m" corresponds to the electrical angle of 360 degrees. In the embodiment of the invention, the mechanical angle of 90 degrees corresponds to the electrical angle of 360 degrees.

Figure 9:
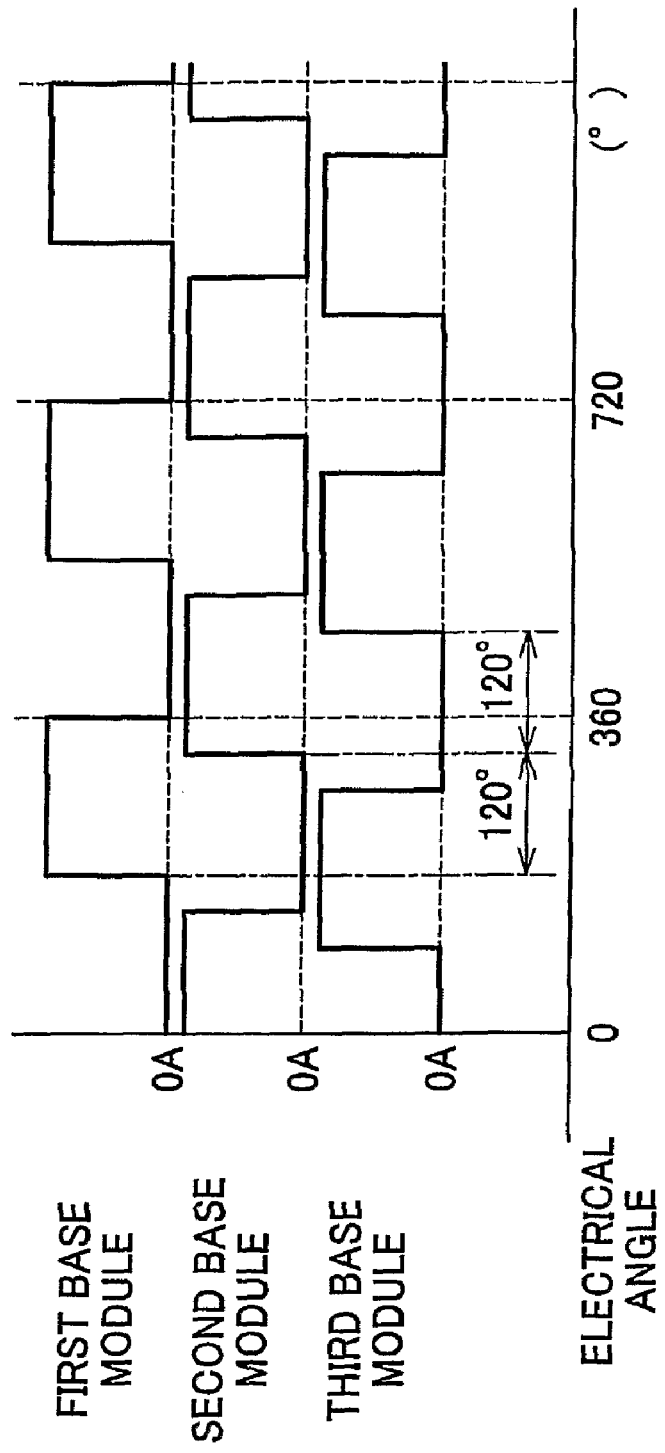
FIG. 9 is the timing chart showing the time during which electric power is supplied to each base module when the rotors rotate in the clockwise direction.

FIG. 9 shows the time during which electric power is supplied to the coils 25 of each base module 10 when the rotors 30 are rotated in the clockwise direction. As shown in FIG. 9, electric power is supplied to the coils 25 of the first base module 10A during the period from when the electrical angle is 180 degrees until when the electrical angle is 360 degrees. The time at which electric power starts to be supplied to the coils 25 of the second base module 10B is offset from the time at which electric power starts to be supplied to the first base module 10A by an electrical angle corresponding to the phase obtained by dividing 360 degrees by the number "n" of the base modules 10 (360°/"n"). In the embodiment of the invention, because the number "n" of the base modules 10 is three, the time at which electric power starts to be supplied to the coils 25 of the second base module 10B is offset from the time at which electric power starts to be supplied to the coils 25 of the first base module 10A by an electrical angle of 120 degrees. The time at which electric power starts to be supplied to the coils 25 of the third base module 10C is offset from the time at which electric power starts to be supplied to the coils 25 of the second base module 10B by the same phase difference as that between the first base module 10A and the second base module 10B. Such electric power supply to the coils 25 is performed in a rectangular wave manner.

Figure 10:
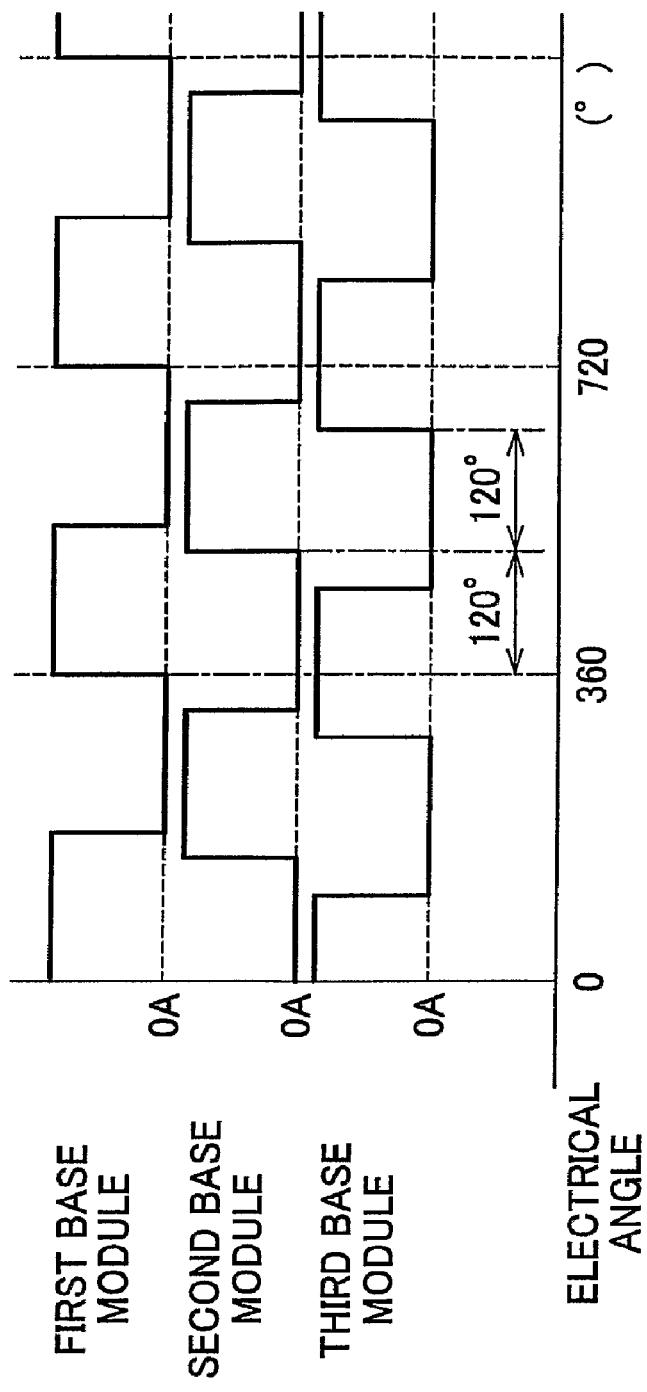
FIG. 10 is the timing chart showing the time during which electric power is supplied to each base module when the rotors rotate in the counter-clockwise direction.

FIG. 10 illustrates the times during which electric power is supplied to the coils 25 of each base module 10 when the rotors 30 are rotated in the counter-clockwise direction. Electric power is supplied to the coils 25 of the first base module 10A during the period from when the electrical angle is 0 degrees until when the electrical angle is 180 degrees. The time at which electric power starts to be supplied to the coils 25 of the second base module 10B is offset from the time at which electric power starts to be supplied to the first base module 10A by an electrical angle corresponding to the phase obtained by dividing 360 degrees by the number "n" of the base modules 10 (360°/"n"). Similarly, the time at which electric power starts to be supplied to the coils 25 of the third base module 10C is offset from the time at which electric power starts to be supplied to the coils 25 of the second base module 10B by the same phase difference as that between the first base module 10A and the second base module 10B.

Thus, the electric power supply to the coils 25 of each base module 10 starts at a predetermined time at which the predetermined motor rotational angle is achieved, and continues during the period until when another predetermined motor rotational angle is achieved. Thus, torque can be generated regardless of whether the rotors 30 are rotated in the clockwise direction or the counter-clockwise direction. The amount of electric current supplied to the coils 25 of the base modules 10 is controlled by adjusting the duty ratios of the switching elements S1, S2, and S3 of the switching portion 42, respectively. Namely, when electric power is supplied to the coils 25 in a rectangular wave manner based on the motor rotational angle, the switching elements S1, S2 and S3 are turned on and off at considerably short intervals with respect to the intervals at which electric power is supplied to the coils 25 in a rectangular wave manner. The values of the currents supplied to the coils 25 of the base modules 10 are changed by adjusting the on-duty ratios of the switching elements S1, S2 and S3, respectively.

Figure 11:
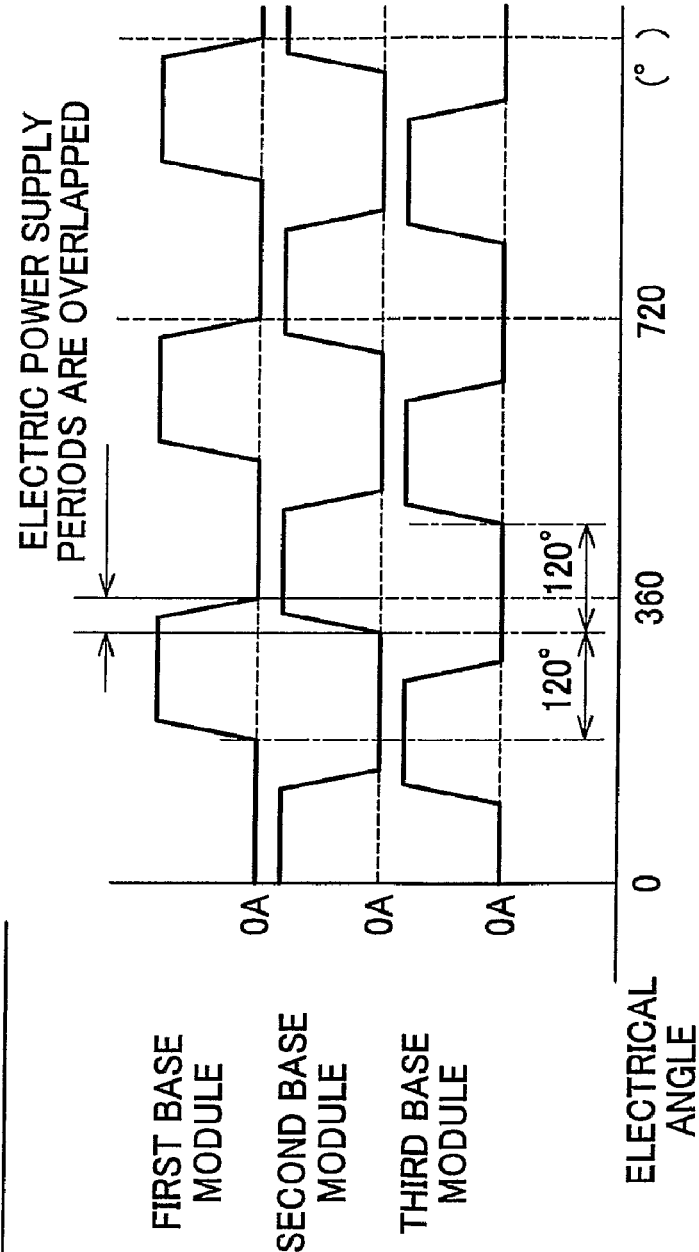
FIG. 11 is the view showing the waveform of the electric power supplied to the motor according to a modified example of the embodiment of the invention.

Electric power may be supplied to the coils 25 in a trapezoid wave manner, as shown in FIG. 11. Namely, the current value is changed (increased/decreased) at a predetermined rate for a predetermined period at each of the initial and final stages of the period during which electric power is supplied to the coils 25. In this case, the period in which the electric current supplied to the coils of one base module 10 rises and the period in which the electric current supplied to the coils of another base module 10 trails are overlapped with each other. Thus, increasing the electric current supplied to the coils in a manner in which the line indicating the electric current supply is sloped reduces changes in the magnetic flux. As a result, motor efficiency improves.

Figure 5A:
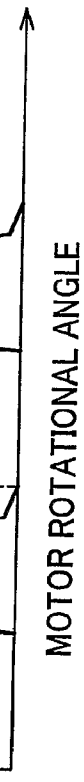
FIGS. 5A and 5B are the views each illustrating the torque characteristics with respect to the rotational angle of the motor.
Figure 5B:
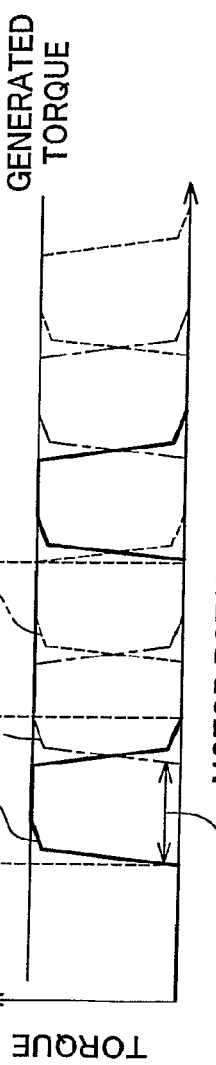

FIGS. 5A and 5B illustrate transition of the torque generated in the base modules 10 with respect to the motor rotational angle when the motor is rotated in the clockwise direction. FIG. 5A shows the torque generated in the first base module 10A. FIG. 5B shows the torques generated in the modules 10A, 10B and 10C and the torque synthesized from these torques. As can be understood from FIG. 5B, a constant torque is obtained at any motor rotational angle by adding the torques generated in the modules 10A, 10B and 10C together.

The motor 1 and the electric power supply control apparatus 40 described so far may be used as the drive unit for the electric power steering system for a vehicle. As shown in FIG. 17, the electric power steering system supplies steering assist torque in a steering mechanism 50 that includes the driver's steering wheel 51 that is turned by the driver, a steering shaft 52 that is fixed to the driver's steering wheel 51, a rack bar 53 that moves in the vehicle-width direction of the vehicle body, a rack-and-pinion mechanism 54 that transmits rotation of the steering shaft 52 to the rack bar 53, and a tie rod 56 that transmits lateral movement of the rack bar 53 to knuckle arms 55 of respective wheels W. The electric power steering system includes a speed reduction gear 57 fitted to the steering shaft 52, the motor 1 that meshes with the speed reduction gear 57 and supplies rotational torque to the steering shaft 52, the steering torque sensor 58 that detects the steering torque applied to the steering shaft 52, and the electric power supply control apparatus 40 that controls electric power supply to the motor 1.

As described above, with the motor 1 used in the electric power steering system, even if high power is produced, neither loss torque nor cogging torque is generated, and motor inertia is maintained low. In addition, combining multiple base modules 10 with each other suppresses torque fluctuations while the motor 1 is being driven. As a result, with the electric power steering system, even if high power is output and high efficiency is achieved, steering feel felt by the driver does not deteriorate.

Figure 12:
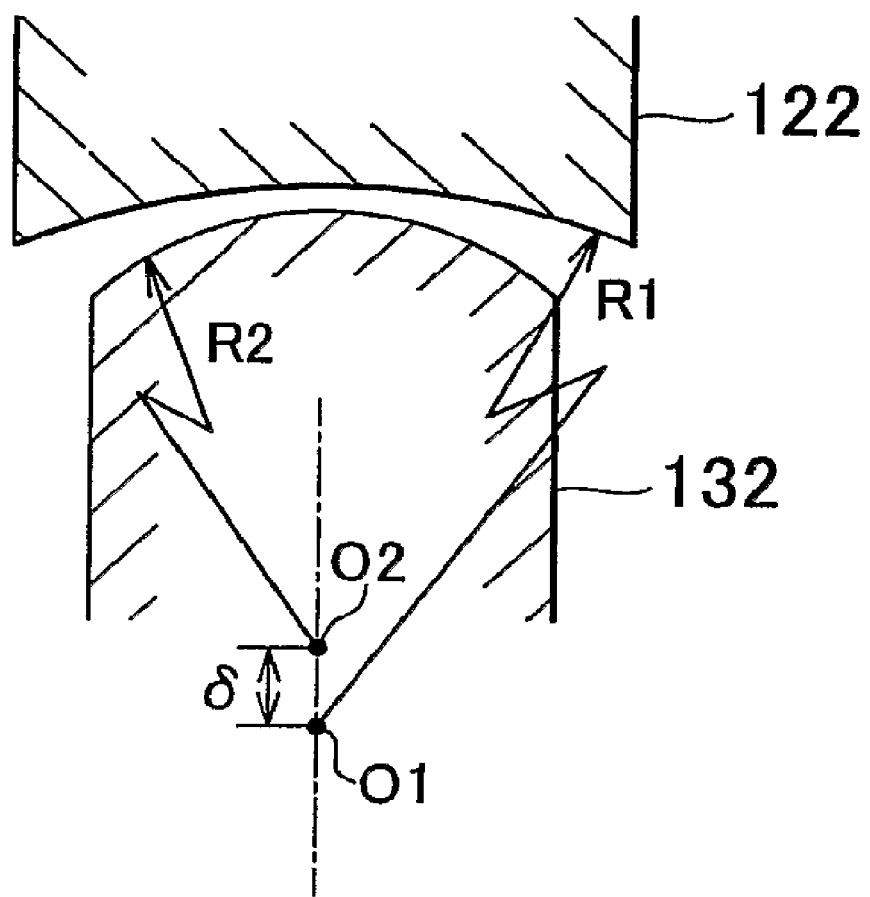
FIG. 12 is the view showing the shape of an air gap between the magnetic poles according to a modified example of the embodiment of the invention.

Next, modified examples of the structure of the base modules 10 will be described. First, a modified example of the shapes of the end portions of the rotor pole 32 and the stator pole 22 of the base module 10 will be described. FIG. 12 shows the end portions of a rotor pole 132 and a stator pole 122 according to the modified example of the embodiment, when viewed from the front in the axial direction. In the modified example, the length of the air gap maintained between the rotor pole 132 and the stator pole 122 which face each other increases as the distance from the center-line of the pole increases in the circumferential direction. In the modified example, the end face of the stator pole 122 is formed in a curved face that partially forms the face of a virtual cylinder that shares a rotational shaft center O1 with the rotor 30 and has a radius R1. Meanwhile, the end face of the rotor pole 132 is formed in a curved face that partially forms the face of a virtual cylinder that has the shaft center at a center O2 that is offset from the rotational shaft center O1 of the rotor 30 by a distance δ outward in the radial direction and that has a radius R2.

With this structure, the torque changes moderately and smoothly with respect to the amount by which the rotor 30 moves. The rotor pole 132 and the stator pole 122 come close to each other and apart from each other as the rotor 30 rotates. A change in the torque when the rotor pole 132 and the stator pole 122 move with respect to each other while facing each other is reduced. For example, if a change in the torque is shown by using the torque characteristics in FIG. 5, a region "t" where the maximum torque is obtained can be made flat. As a result, the motor with less torque fluctuations is formed. In the modified example, the degree at which the end face of the rotor pole 132 is curved is high. Alternatively, the degree at which the end face of the stator pole is curved may be low. Namely, the curved face that forms the end face of the stator pole may be a part of the face of a virtual cylinder that has the shaft center at the position that is offset from the rotational shaft center O1 of the rotor 30 in the direction in which the distance from the stator pole increases. Also, only the end face of the stator pole may be flat.

Next, modified examples of the shape of the end shoulder portion of the rotor pole 32 or the stator pole 22 of the base module 10 will be described. FIGS. 13A, 13B and 13C show rotor poles 232, 332, and 432 according to the three modified examples, respectively. In FIGS. 13A, 13B, and 13C, the end portions of the rotor poles 232, 332, and 432 are viewed from the front in the axial direction The rotor pole 232 in FIG. 13A is formed by cutting each end shoulder portion so that the cross section of the end shoulder portion has an arc shape. A curved face P1 (a curved face that partially forms the face of a virtual cylinder having a radius R) is formed. The radius R for the curved face P1 is considerably smaller than the radius for the curved face (the curved face that partially forms the face of the virtual cylindrical) that forms the center portion of the end face of the rotor pole 232. The rotor pole 332 shown in FIG. 13B is formed by beveling each end shoulder portion so that a sloped face P2 is formed. The rotor pole 432 shown in FIG. 13C is formed by beveling each end shoulder portion in two stages so that sloped faces P3 and P4 are formed. According to these modified examples, the characteristics of the initial change in the attraction force with respect to the rotational movement amount of the rotor 30 can be made appropriate.

For example, in the torque characteristics in FIG. 5A, the rate at which the torque increases in the torque-increasing region "s" may be adjusted by adjusting the shape of the end shoulder portion of the pole. In the period in which the torque increases, the periods during which the torque is generated are overlapped with each other when the base modules 10 are used in combination. Accordingly, in the modified examples of the embodiment, each end shoulder portion of the rotor pole 32 is cut into a predetermined shape. Thus, appropriate torque characteristics are obtained, and the motor with less torque fluctuation is formed. The shape of the end shoulder portion is not limited to those described in the modified examples. For example, the shape of the end shoulder portion may be formed by combining multiple curved faces, beveling the end shoulder portion in three or more stages, or both forming curved faces and beveling the end shoulder portion. Alternatively, the end shoulder portion of the stator pole 22 may be cut in a predetermined shape. Further alternatively, the end shoulder portions of both the rotor pole 32 and the stator pole 22 may be cut in predetermined shapes.

Figure 14A:
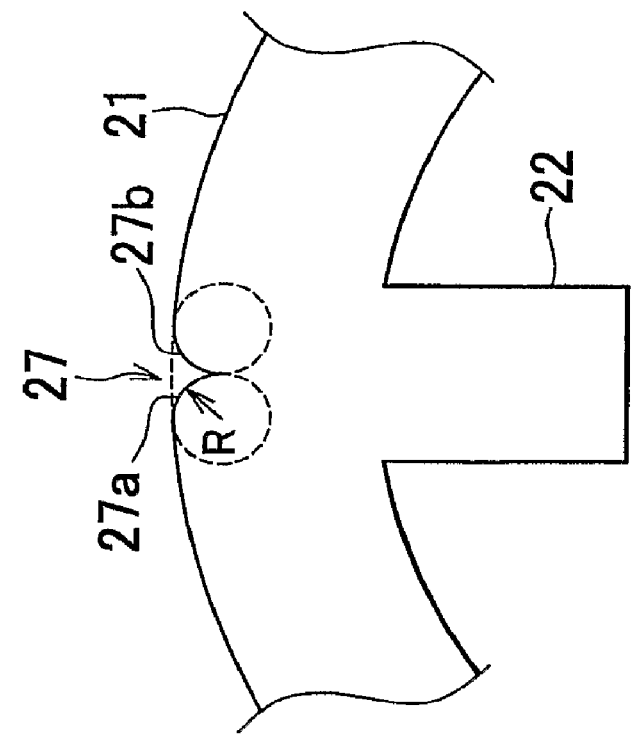
FIGS. 14A and 14B are the views showing notch grooves formed in a ring body according to modified examples of the embodiment of the invention.
Figure 14B:
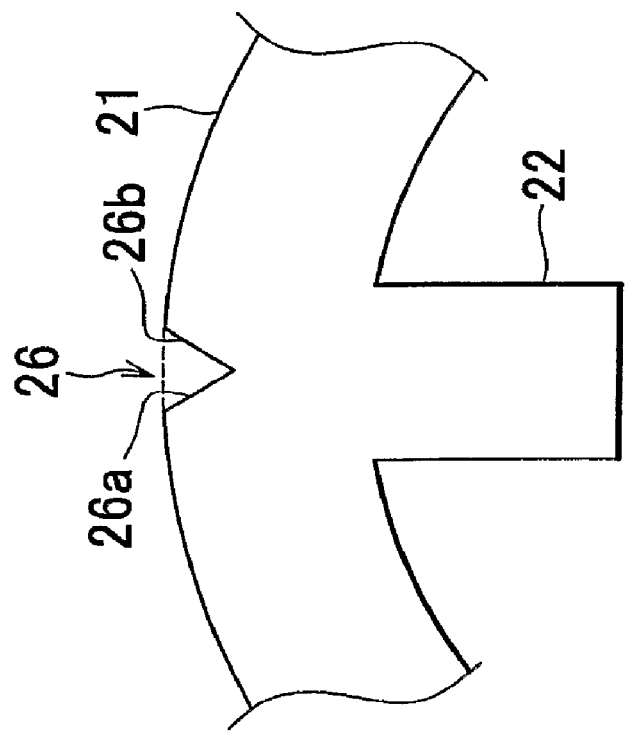

Next, modified examples of the ring body 21 of the stator 20 in the base module 10 will be described. FIGS. 14A and 14B show the portion of the stator 20, at which the stator pole 22 is formed, according to the modified examples. FIG. 14A shows a first modified example, and FIG. 14B shows a second modified example. In the first modified example, a notched groove 26, which is recessed inward in the radial direction, is formed in the outer face of the ring body 21 at the position at which the stator pole 22 is formed. In the second modified example, a notched groove 27, which is recessed inward in the radial direction, is formed in the outer face of the ring body 21 at the position at which the stator pole 22 is formed. In the first modified example, the notched groove 26 is a space which has a V-shaped cross section and which is defined by the two inclined faces 26a, 26b. In the second modified example, the notched groove 27 is a space which has a substantially V-shaped cross section and which is defined by two curved faces 27a, 27b (the curved faces each of which partially forms the face of a virtual cylinder having the radius of R). In both the first and second modified examples, each of the centers of the notched grooves 26, 27 may coincide with the center-line of the stator pole 22.

According to these modified examples, when the magnetic field generated by the permanent magnet 24 is pushed back by the magnetic field generated by the coil 25, the inclined faces 26a, 26b that define the notched groove 26 or the curved faces 27a, 27b that define the notched groove 27 guide the flow of magnetic flux toward the stator pole 22. Accordingly, the magnetic flux can be made to flow appropriately toward the rotor 30 when electric power is supplied to the coils 25. As a result, the attraction force between the poles can be efficiently generated. In addition, the weight of the ring body 21 is reduced.

Figure 15:
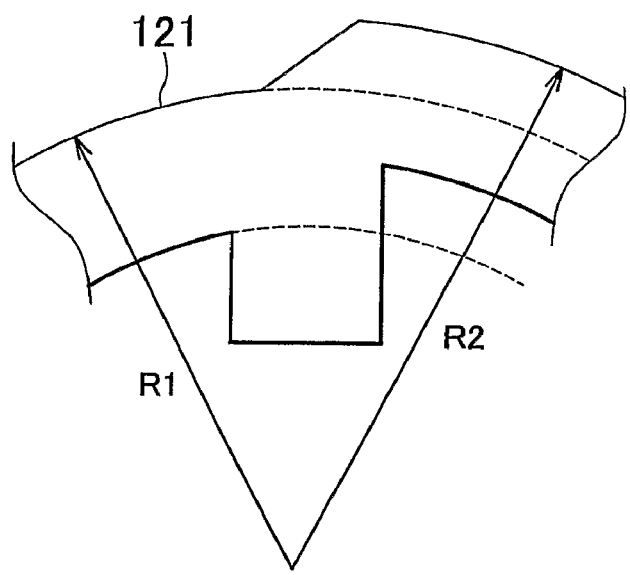
FIG. 15 is the partially enlarged view of a ring body according to a modified example of the embodiment of the invention.
Figure 16:
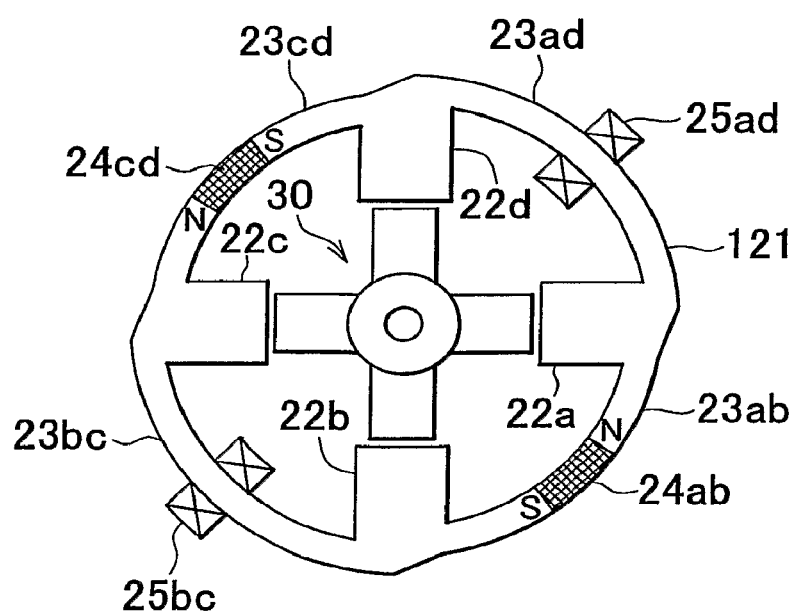
FIG. 16 is the cross-sectional view of a base module according to the modified example of the embodiment of the invention, which is obtained by cutting the base module in the radial direction thereof.

Next, a modified example of the ring body 21 of the base module 10 will be described with reference to FIGS. 15 and 16. The radius (the inner radius and the outer radius) of a ring body 121 changes at the boundary on which the stator pole 22 is formed. An outer radius R2 of the ring body 21 at each of the inter-pole magnetic path portion 23ad and 23bc around which the coils 25ad and 25bc are wound, respectively, is greater than an outer radius R1 of the ring body 21 at each of the inter-pole magnetic path portions 23ab and 23cd in which the permanent magnets 24ab and 24cd are buried, respectively. In this case, because the width of each inter-pole magnetic path portion 23 in the radial direction is the same, the inner radius of the ring body 21 at each of the inter-pole magnetic path portions 23ad and 23bc is greater than the inner radius of the ring body 21 at each of the inter-pole magnetic path portions 23ab and 23cd. Namely, in the ring body 121, the ring radius, which is the distance between the line connecting, in the circumferential direction, the centers of the inter-pole magnetic path portions 23 in the radial direction to the rotating shaft center of the rotor, changes by a predetermined length at the boundary at which the stator pole 22 is formed.

Thus, the radius of the ring body 21 from the shaft center differs between the inter-pole magnetic path portions 23ab and 23cd at which the permanent magnets 24ab and 24cd are arranged, respectively, and the inter-pole magnetic path portion 23ad and 23bc around which the coils 25ad and 25bc are wound, respectively. Accordingly, the magnetic flux of the permanent magnet 24 that flows in the circumferential direction of the ring body 121 is more easily guided toward the stator pole 22, when electric power is supplied to the coil 25. As a result, when electric power is supplied to the coil 25, the magnetic flux is appropriately made to flow toward the rotor 30, and the attraction force between the poles can be efficiently generated. In addition, because the radius of the ring body 21 at the inter-pole magnetic path portion 23ad and 23bc around which the coils 25ad, 25bc are wound, respectively, is greater than the radius of the ring body 21 at the inter-pole magnetic path portions 23ab and 23cd at which the permanent magnets 24ab, 24cd are arranged, a greater space for the coils 25 is secured on the inner side of the ring body 121. Because the rotor 30 is arranged on the inner side of the ring body 121, the space for the coil 25 is strictly limited. However, according to the modified example, such inconvenience is minimized.

While the motor and the electric power supply control apparatus for the motor according to the embodiment of the invention has been described, it is to be understood that the invention is not limited to the embodiment. To the contrary, the invention is intended to cover various modifications and equivalent arrangements within the scope of the invention.

For example, the motor and the electric power supply control apparatus for the motor according to the embodiment of the invention are used in the electric power steering system. However, such motor and electric power supply control apparatus may also be used in other devices as appropriate. Also, the number of the base modules and the number of the poles may be selected as appropriate for a particular application.

The invention claimed is:

1. A motor which is formed by connecting multiple base modules to each other in a direction in which a rotating shaft extends, and in which an electric power supply to each base module is controlled by an electric power supply control apparatus, the base module including:
   a stator including a hollow cylindrical ring body that forms a magnetic path, wherein an even number of stator poles are arranged at regular intervals in a circumferential direction of the ring body and the stator poles project inward, in a radial direction, from an inner face of the ring body; and
   a rotor, arranged coaxially within the stator, that forms a magnetic path, wherein the rotor has the same number of rotor poles as the stator poles, the rotor poles project outward, in the radial direction, from an outer face of the rotor, the rotor poles are arranged at regular intervals in the circumferential direction, and the rotor poles face the stator poles formed on the stator when the rotor is at a predetermined rotational position;
   a permanent magnet arranged in an alternate inter-pole magnetic path portion among an even number of inter-pole magnetic path portions located between successive stator poles so that a magnetic field pointing in the circumferential direction of the ring body is generated in the same direction; and
   a coil, which generates a magnetic field that opposes the magnetic field generated by the permanent magnet using electric power supplied by the electric power supply control apparatus, and that is wound around the remainder of the alternate inter-pole magnetic path portion where no permanent magnet is arranged,
   wherein the rotational position at which the stator pole and the rotor pole face each other varies with each base module by a substantially equal phase difference.

2. The motor according to claim 1, wherein the rotor is symmetric with respect to a rotating shaft of the rotor.

3. The motor according to claim 1, wherein the stator and the rotor are soft magnetic bodies.

4. The motor according to claim 3, wherein the stator and the rotor are each formed by stacking multiple magnetic steel sheets each of which has a thickness up to one millimeter.

5. The motor according to claim 1, wherein, when the stator pole and the rotor pole face each other and center-lines of the stator pole and the rotor pole coincide, a length of an air gap between the stator pole and the rotor pole increases as a distance from the center-lines of the stator pole and the rotor pole in the circumferential direction increases.

6. The motor according to claim 5, wherein end faces of the stator pole and the rotor pole, which face each other, are curved faces that partially form faces of virtual cylinders, and wherein an axis of the virtual cylinder, the face of which includes the end face of one of the stator pole and the rotor pole, is offset from a center of the rotating shaft in the radial direction.

7. The motor according to claim 1, wherein
a notched groove that is recessed inward in the radial direction is formed in an outer face of the ring body of the stator at a position at which the stator pole is formed.

8. The motor according to claim 1, wherein
a radius of the ring body at the inter-pole magnetic path portion around which the coil is wound is greater than a radius of the ring body at the inter-pole magnetic path portion in which the permanent magnet is arranged.

9. The combination motor according to claim 1, wherein
an air gap is maintained between the successive base modules.

10. An assembly comprising:
a motor according to claim 1;
an electric power supply control apparatus that controls an electric power supply to said motor, said apparatus comprising:

a rotational angle sensor that detects a rotational angle of the rotor; and
an electric power supply portion that supplies, based on the rotational angle detected by the rotational angle sensor, electric power to the coils of the base modules at times that vary with each base module by a phase difference corresponding to an electrical angle expressed by an equation, electrical angle of 360°/n, where "n" represents the number of the base modules, and an electrical angle of 360° corresponds to a value obtained by dividing a mechanical angle of 360° by the number (m) of poles of one base module.

11. Use of a motor according to claim 1,
as a drive unit for an electric power steering system that supplies steering force to a steering wheel of a vehicle.

* * * * *